United States Patent [19]

Starbuck et al.

[11] 4,078,113
[45] Mar. 7, 1978

[54] METHOD OF PRODUCING CERTAIN TRANSPARENT ADHESIVE LAUROLACTAM COPOLYAMIDE FILMS

[75] Inventors: Herman S. Starbuck; William Raymond Jones; John Edward Mahn, all of Cincinnati, Ohio

[73] Assignee: General Fabric Fusing, Inc., Cincinnati, Ohio

[21] Appl. No.: 632,417

[22] Filed: Nov. 17, 1975

[51] Int. Cl.² .......... B29B 3/02; B32B 27/08; B32B 27/12; B32B 27/34
[52] U.S. Cl. .............. 428/196; 156/246; 156/277; 260/37 N; 260/78 L; 260/78 S; 264/176 R; 264/213; 264/216; 264/331; 428/200; 428/204; 428/207; 428/246; 428/262; 428/302; 428/349; 156/244.24
[58] Field of Search .......... 428/195, 196, 200, 204, 428/246, 262, 349, 302; 260/37 N, 78 S, 78 L; 156/244, 246, 277; 264/176 R, 216, 331

[56] References Cited

U.S. PATENT DOCUMENTS

| | | | |
|---|---|---|---|
| 3,322,605 | 5/1967 | Frech | 156/277 |
| 3,386,645 | 6/1968 | Powell | 428/204 |
| 3,423,273 | 1/1969 | Mayer | 156/246 |
| 3,449,299 | 6/1969 | Schneider et al. | 260/78 S |
| 3,477,094 | 11/1969 | Maahs et al. | 260/78 L |
| 3,515,702 | 6/1970 | Raabe | 260/78 |
| 3,607,519 | 9/1971 | Beyer | 156/277 |
| 3,804,813 | 4/1974 | Takamiya et al. | 260/78 L |
| 3,840,497 | 10/1974 | Gondorchin et al. | 260/78 L |
| 3,905,946 | 9/1975 | Nieswandt et al. | 260/78 L |
| 3,950,297 | 4/1976 | Raabe et al. | 260/78 L |
| 3,951,909 | 4/1976 | Feldmann et al. | 260/78 L |
| 3,989,677 | 11/1976 | Brassut et al. | 260/78 L |
| 3,997,646 | 12/1976 | Schneider et al. | 260/78 L |

*Primary Examiner*—J.C. Cannon
*Attorney, Agent, or Firm*—Cook, Wetzel & Egan, Ltd.

[57] ABSTRACT

A method for producing transparent or pigmented films from resin particles, of a particular class of laurolactam containing polyamide copolymers and/or terpolymer, said film suitable as a coating and/or heat melt adhesive for fabrics and other materials. The method comprises drying the resin while in the solid state until it is substantially water free, extruding the dried resin particles while heating to a temperature sufficient to volatilize and drive off unreacted monomer contaminants, but below the degradation temperature of the resin, expelling the molten resin from the extruder onto heated, sheeting dye means to form a film therefrom, dropping the film onto a substrate backing material, and running the film and backing through a roller to achieve a uniform and controlled thickness.

15 Claims, 3 Drawing Figures

METHOD OF PRODUCING CERTAIN TRANSPARENT ADHESIVE LAUROLACTAM COPOLYAMIDE FILMS

BACKGROUND OF THE INVENTION

The present invention generally concerns hot melt adhesives and coatings. More specifically, the present invention is directed to a transparent or pigmented film from a specific polyamide copolymer and/or terpolymer resin having characteristics making such resin suitable for use as a hot melt fabric adhesive, fabric patch adhesive, adhesive for other materials, or as a coating for a large variety of different materials.

In the prior art certain polyamide or nylon resins have been attempted for use as bonding materials for delicate synthetic fabrics, which characteristically have a relatively low melting point. Polyamide hot melt adhesives have been thought to be desirable for this purpose because of their correspondingly low melting points. In other words, with polyamide hot melt adhesives it would not be necessary to heat the adhesive to a temperature above the degradation temperature of the fabric in order to achieve a secure bond.

However, polyamide adhesives have had a number of disadvantages associated therewith. Because of their inherent stiffness, polyamides have been available for use as hot melt fabric adhesives generally only in web form or in powders. Powders have been messy, wasteful and difficult to use, with the consumer often using too much or too little adhesive for the particular adhesive application concerned. Webs of polyamide adhesive, while not as stiff as a solid film would be, generally have been unsatisfactory to use, because of the reduced amount of adhesive per unit area due to the presence of holes in the web. This debilitating characteristic has resulted in greatly reduced peel strength with correspondingly weak bonding of fabric to fabric.

One particular resin has been proposed by those skilled in the art as a hot melt film adhesive for bonding fabrics where the susceptability of the fabric to thermodegradation precludes the use of conventional higher melting adheives. Such proposed resin is a polyamide copolymer and/or terpolymer consisting essentially of the polyamide condensation product of: (a) laurolactam monomer in amounts of 80% to 20% by weight of the composition; and (b) a co-condensible monomer member selected from the group consisting of caprolactam, hexamethylene diamine adipate, hexamethylene diamine sebacate, and mixtures thereof in amounts of 20% to 80% by weight. Examples of such laurolactam containing polyamide copolymers are given in U.S. Pat. No. 3,515,702.

The melting point of the laurolactam containing resin utilized in the method of the present invention is in the range of approximately 240° F., which has been shown to be satisfactory for bonding the vast majority of fabrics without heat damage thereto. However, heretofore by prior art methods, it has not been possible to make a transparent film of such resins with all their attending advantages. Prior art techniques, including the extrusion technique of film forming, have resulted in a foggy, cloudy and unattractive film of these otherwise suitable laurolactam containing resins. This has substantially reduced, if not completely destroyed, their utility as fabric adhesives for many applications. That is the fact because a cloudy or foggy film, especially when used to bond delicate fabrics, will show through the fabric and can be seen around the edges of the bond. This factor substantially detracts from the attractiveness of the clothing article or other article being bonded. Pigmented films of such resins have likewise been foggy and unattractive, which has considerably reduced their utility for label and applique application. Accordingly, such laurolactam containing polyamide resins in the prior art have been substantially lacking in utility for a number of bonding applications in spite of their other favorable characteristics, such as pliability, exceptional resistance to dry cleaning solvents, and good launderability in the normal laundering range of temperatures.

Accordingly, it is an object of the present invention to provide a film containing all the advantages of such resins, which film is transparent, to provide thereby utility in applications of fabric bonding.

It is an additional object of the present invention to provide a film of such laurolactam containing resins for yet further applications, which applications include the use of pigmentation.

Yet a further object of the present invention is to provide a film, transparent or pigmented, which possesses characteristics giving it utility for use in such applications as the coating of various materials.

It is yet an additional object of the present invention to provide a film, transparent or pigmented, of such laurolactam containing resins which is esthetically suitable for the imprinting of visual indicia on the surface thereof.

It is an additional further object of the present invention to provide a method of producing a transparent film from such laurolactam containing polyamide resin particles, said film being useful as a hot melt adhesive for fabric and other materials and as a surface coating for a variety of other materials.

It is yet a further object of the present invention to provide a method of producing a transparent film of such laurolactam containing polyamide resin particles, said method comprising drying said particles, extruding and heating said resin at temperatures sufficient to drive off monomer contaminants but not sufficient to degrade the resin, forming a film of molten resin and dropping the film onto a substrate backing means, and rolling said film to a uniform thickness.

It is yet a further additional object of the present invention to provide a method for forming a transparent film of such laurolactam containing resins by extrusion wherein the extrusion temperatures are maintained above approximately 350° F., but below approximately 420° F.

It is also yet a further additional object of the present invention to volatilize and drive off unreacted monomers in such raw laurolactam containing resins during the extrusion and heating thereof.

It is yet a further additional object of the present invention to provide a method whereby a concentration of such resins and a pigment is prepared and added prior to heating and extruding said laurolactam containing resin.

These and other objects and advantages of the present invention are accomplished by means which are set forth more fully with reference to the following drawing:

DETAILED DESCRIPTION OF PREFERRED EMBODIMENTS

Figure 1:
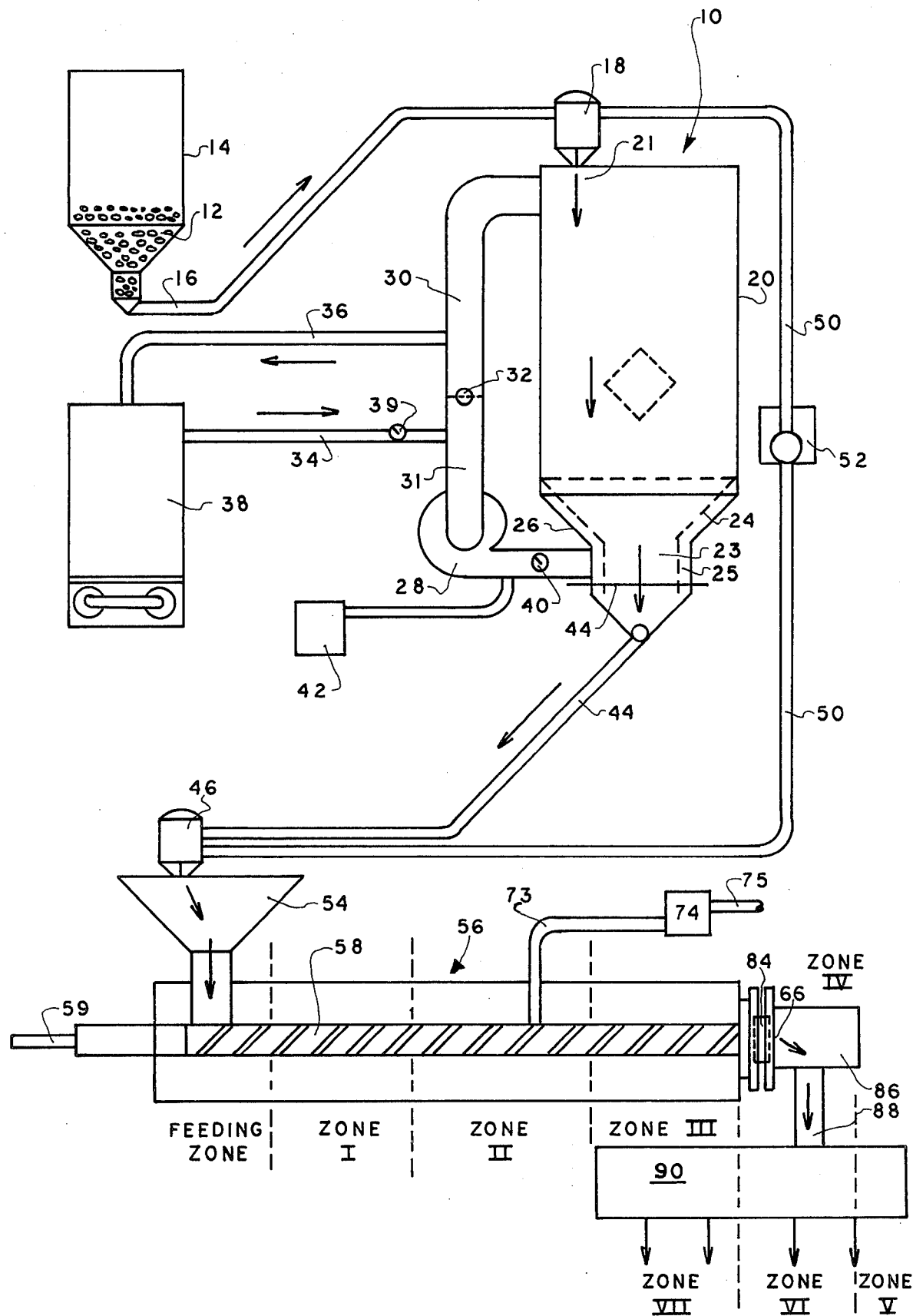
FIG. 1 is a schematic, flow chart depicting the method of the present invention and showing means for drying, heating and extruding, mixing and forming said laurolactam containing resins in transparent or pigmented films.

A preferred embodiment of the present invention contemplates a method of producing a transparent film of laurolactam containing polyamide resin particles. Such films find utility as hot melt adhesives for fabrics and other materials, as well as coatings to be heat melted and bonded to the surface of various materials. The method of the present invention comprises in preferred embodiments, drying the raw resin particles while in the solid state until they are substantially water free. In the raw resin such water clings by absorption to the surface of the resin particles and may preferably be removed by circulating air at controlled temperature through a quantity of the resin disposed into a hopper.

Next, the resin particles are extruded while being heated to the molten state. The resin particles are heated to a temperature sufficient to volatilize and drive off any unreacted monomer contaminants which may be present, but at a temperature below the degradation temperature of the resin. The temperature range is above approximately 350° F., but below approximately 420° F. The molten resin is then expelled from the extruder into a heated, sheeting dye means which further drives off any unreacted monomers. The heated, sheeting dye means functions to form a film over the dye lips thereof from the molten resin.

Then, the film is dropped onto a substrate backing means and the film and substrate backing are rolled through a roller to a uniform, controlled thickness.

Additionally contemplated in alternative embodiments is the mechanical mixing of the molten resin mass prior to its being expelled onto the heated, sheeting dye. A further alternative embodiment of the method of the present invention includes use of a vacuum line connected to the extruder, whereby the driving off of unreacted monomers may be materially aided. One further feature of the preferred embodiments of the present invention is the inclusion of supplementary heating of the molten resin prior to the mechanical mixing thereof. Also alternatively, the molten resin mass may be screened through a breaker plate prior to further heating thereof. During such extruding, the extruder barrel may be cooled, preferably by centrally disposed water circulating means.

The unreacted monomers driven off the molten resin mass are preferably driven off in amounts of between approximately one to four percent by weight of the molten resin present.

Pigmented films in clear, sharp colors may also be produced in accordance with the method of the present invention by mixing raw resin particles with any of a variety of pigments and adding that concentrate to the resin particles prior to the extruding and heating thereof.

The method of the present invention also concerns a transparent film product of resin which has a substantially reduced amount of unreacted monomer. Such films may have one or more pigmentation means, including dye stuffs, dispersed therein to produce clear, sharp colors. These films are useful for a variety of hot melt adhesive applications, and especially as a fabric adhesive, but also may be useful as labels, transparent or pigmented, with visual indicia imprinted on at least one side thereof. The clear film of such resins may be used to produce a heat and chemical resistant invisible weld of one material to another, which welds are especially useful in laminating delicate fabrics and where flexibility and invisibility of bonding are required.

Film hot melt adhesives in accordance with the present invention find application for such apparel uses as labels, emblems, appliques, shirt fronts, patches, flies, collars and cuffs on such delicate and other fabrics, such as linen, hemp, jute, cotton, nylon 6,6, acrylic, nylon 6, spandex, wool, rayon acetate and others. The resulting bonds may be dry cleaned or laundered at normal temperatures without damage, due to the excellent chemical and heat resistance of the resins used.

The method of producing a transparent film of laurolactam containing polyamide resin of the present invention may be better understood with specific reference to FIG. 1 hereof. The first step in the preferred embodiment of the method of the present invention is the drying of the raw resin particles to remove all adsorbed water on the surface thereof. That step is accomplished by means of drying equipment means generally set forth as 10 in FIG. 1.

First, the raw resin particles 12 are transfered to a loading hopper 14 from which they are dispensed through a material flow line 16 by means of an upper vacuum loader means 18. Next, resin particles 12 are dispensed into a drying and conditioning hopper means 20 at the top portion 21 thereof. The filling of hopper 20 is accomplished by a combination of vacuum loader means 18 and gravity.

Drying and conditioning hopper 20 has disposed at bottom portion 23 thereof a perforated inner cone and material distributor 24 which defines a space 25 between such distributor 24 and lower wall 26 of drying and conditioning hopper 20 for ease of circulation of air therethrough. Opening into defined space 25 is recirculating blower 28, which receives air from a desiccant dryer 38 through a lower blower line 31. Disposed between lower blower line 31 and upper blower line 30 is balancing damper 32 for preventing backflow of circulating air. Lower recirculating line 31 is fed into by dry air supply line 34 at a point below such damper means 32. Return air line 36 leads into a desiccant dryer 38 having at least a −20° F. dew point.

Thus, the path of air flow for drying the resin is from desiccant dryer 38 through dry air flow line 34 to lower recirculating line 31, through recirculating blower 28, into defined space 25 between perforated inner cone 24 and drying and conditioning hopper lower wall 26, into drying and conditioning hopper 20 itself, exiting at the top 21 thereof through upper recirculating blower line 30, through wet air line 36 and back to the desiccant dryer. The drying system 10 is preferably equipped with temperature indicators 39, 40 disposed for monitoring proper air temperature thereof and a dew point indicator 42. Typical dry air supply and blower operating temperatures are approximately 150° F. - 160° F. and approximately 140° F. - 150° F. respectively.

Next, the dried resin particles pass through a blast gate 44 into a lower material flow line 44 to a lower vacuum loader 46. Both upper and lower vacuum loaders 18, 46 are aided in their functioning by a vacuum supply line 50 connected to vacuum means 52. The dried resin particles next enter an extruder hopper 54 for entry into an extruder means generally designated as 56, the screw 58 of which is water cooled by centrally disposed water line means 59.

Figure 2:
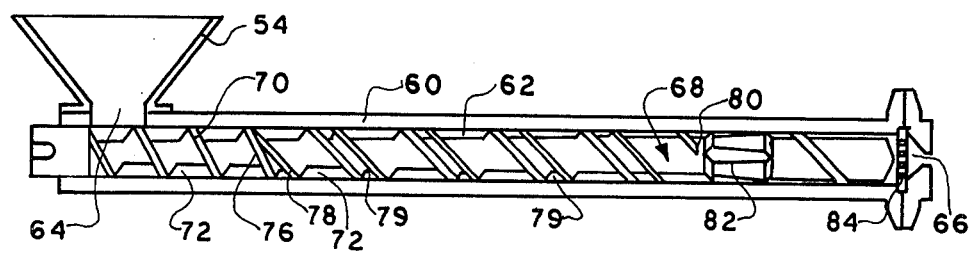
FIG. 2 is a cross section in greater detail of extruding equipment with a single stage screw suitable for use in the present invention.

Referring now to FIG. 2, which shows in greater detail the compoent parts of extruder means 56 set forth schematically in FIG. 1. Such extruder means 56 preferably may be a 2½ inch 20:1 screw extruder, although other forms may be utilized without departing from the spirit and scope of the method of the present invention. Such extruder means 56 includes a body 60 having a heated cylindrical bore 62 therein and including at one end an inlet 64. Material to be extruded is to be delivered at such inlet 64 and molten material is discharged at the other end through an outlet 66.

Rotatably counted within the cylindrical bore for rotation by a suitable power mechanism (not shown) is an extruder screw 68, which includes preferably and extending throughout the length of the screw a first helical land 70. Helical land 70 defines a main channel 72 extending along the entire length of the extruder screw. Main channel 70 may be divided into four heating zones, each of which is electrically heated and monitored by thermocouple, as shown in FIG. 1;

a. a relatively cool, feeding zone in which the solid resin particles are conveyed from inlet 64 to the remainder of the screw;
   b. two melting zones I and II wherein the resin particles are melted; and
   c. a metering zone III, in which the molten resin is maintained at the proper temperature, mixed and delivered to outlet 66 at a uniform pressure and rate.

Either a single stage (as shown) or a double stage extruder screw may be used. When a double stage screw is used, an extruder vent 73 is supplied communicating with the main channel of the extruder for efficient removal of unreacted monomers. Such extruder vent 73 leads into a monomer trap 74 which is in turn connected to a vacuum supply line 75, as shown in FIG. 1.

Helical land 70 in the feeding zone is of such length, depth and pitch designed for the conveying of solids into melting zone I. As shown in FIG. 2, at a point within melting zone I and II where some melting has occurred, a portion 76 of the helical land 70 increases in pitch to speed up the movement of the resin particles. At a point slightly upstream therefrom a second helical land 78 begins from the first helical land 70 to diverge therefrom and to define an auxiliary channel 79. At that point the depth of the main channel 72 decreases along the length of the extruder screw 68. The periphery of main helical land has a constant diameter throughout and is spaced closer to the inner surface of the extruder bore than is the periphery of the auxiliary land 78. As a result, the molten resin material in melting zone I and II is increased in speed and any molten resin in the main channel 72 tends to flow freely over the lower periphery of the auxiliary land 78 into the auxiliary channel 79.

The auxiliary helical land 78 terminates at the beginning at the metering zone III at point 80. However, the depth of the main channel 72 remains constant.

In operation as screw 68 is rotated, the resin particles are fed from inlet 64 into the feed zone. As the material enters the melting zone I, it is subjected to a shearing action against the extruder bore, which together with the heat thereof begins to melt the resin. Melting of the resin occurs at the interface between the solid resinous material and the bore and toward the rear of the main channel 72 adjacent main land 70. By the time the material has reached the area of the auxiliary channel 79 a portion of the resin is in the molten state. At this point, the lead or pitch of land 70 increases without any increase in the cross sectional area of main channel 72 at which point the resin is moved at a more rapid rate and any pressure that has occurred on the resin in main channel 72 is substantially reduced. Thus, the molten resin in the main channel 72 is permitted to pass relatively freely into the empty leading edge of the auxiliary channel 79. When such molten material moves freely into the auxiliary channel 79, additional volumetric area is made available for an increased amount of solid resin.

Continued rotation of screw 68 will produce further melting in main channel 72 and any molten resin will pass progressively freely into the auxiliary channel 79 until such auxiliary channel 79 is full at a point downstream. After such auxiliary channel 79 is full of molten material, no further molten material will flow over the auxiliary land 78 into the auxiliary channel 79 and continued rotation of the screw will force the solid resin in the main channel 72 to be sheared against the heated surface of the bore to be melted.

Metering zone III is quite shallow and long and has a greater pitch than melting zones I and II, so that a greater area of molten resin is exposed to the heated surface of the bore. Within metering zone III, a mixing section 82 may be provided to give low shear mixing and uniformity of melt.

The temperatures of zones I, II and III may preferably be approximately 275° – 280° F., 360° – 365° F and 380° – 385° F., respectively.

At the end of the extruder barrel 60 may be disposed a breaker plate 84 which comprises a single hundred mesh or a pair of twenty mesh screen means to give a back pressure which drives monomer contaminants backwards and provides additional mixing.

With reference to FIG. 1, downstream of such breaker plate 84 is disposed heating and adapter means 86 (Zone IV in FIG. 1) for channeling such molten resin to static mixer 88, shown schematically in FIG. 1, from which the molten resinous material is delivered to a sheeting die means 90. Also, film die means are intended to be included. Heated sheeting die means 90 is divided into heated zones V, VI and VII which are maintained at approximately 375° – 400° F., 385° – 405° F., and 400° – 420° F., respectively with a temperature in the melt zone of approximately 350° F. Heating and adaptor means 86 (Zone IV) is preferably maintained at approximately 360° F. The die lips of such sheeting die 90 are heated and any remaining monomer contaminants are removed thereby. The die lips of sheeting die 90 are preferably maintained at approximately 380° – 390° F. From the sheeting die means 90, which utilizes a die pressure of approximately 650 – 800 pounds per square inch, a clear film is obtained. Such hot melt film is dropped onto release paper for rolling between a nip roll and chill roll at approximately 60 pounds per square inch to produce the final film of proper and uniform gauge.

Figure 3:
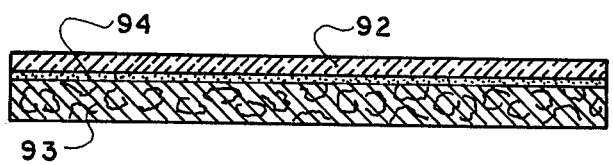
FIG. 3 is a cross section of a film in accordance with the present invention on a substrate backing material.

FIG. 3 shows a cross section of a film 92 in accordance with the present invention on a substrate backing material, which may have a release coating 94 as shown or may be an appropriate uncoated substrate material, such as foil. Film 92 is of uniform and controlled thickness or gauge, which thickness depends upon the particular adhesive or coating application concerned. Typical thicknesses of the finished film are 2 – 10 mils.

Upon review of the disclosure hereof containing the methods, characteristics, features and advantages of the present invention modifications and variations will become apparent to those skilled in the art and such modifications and variations are intended to be covered herein.

What is claimed is:

1. In combination, a transparent adhesive film of a resin consisting essentially of a mixed polyamide condensation product of laurolactam monomer and a co-condensible monomer member selected from the group consisting of caprolactam, hexamethylene diamine adipate, hexamethylene diamine sebacate and mixtures thereof, said laurolactam in amounts of from 80% to 20% by weight and said co-condensible monomer member in amounts of 20% to 80% by weight, said resin having a substantially reduced amount of unreacted monomers, said film having upper and lower surfaces; and
   substrate material means having a surface thereon, the lower surface of said film adhesively hot melted to said surface of said substrate material means.

2. The combination of claim 1 wherein said film has visual indicia imprinted on at least one of the upper and lower surfaces thereof.

3. The combination of claim 2 wherein said substrate material means comprises a fabric.

4. A transparent film of a resin consisting essentially of a mixed polyamide condensation product of laurolactam monomer and a co-condensible monomer member selected from the group consisting of caprolactam, hexamethylene diamine adipate, hexamethylene diamine sebacate and mixtures thereof, said laurolactam in amounts of from 80% to 20% by weight and said co-condensible monomer member in amounts of 20% to 80% by weight, said transparent film having a substantially reduced amount of unreacted monomers.

5. The film of claim 4 further comprising at least one pigmentation means.

6. The film of claim 4 further comprising visual indicia imprinted upon at least one side thereof.

7. The film of claim 5 further comprising visual indicia imprinted upon at least one side thereof.

8. A method of producing a transparent film from resin particles consisting essentially of a mixed polyamide condensation product of laurolactam monomer and a co-condensible monomer member selected from the group consisting of caprolactam, hexamethylene diamine adipate, hexamethylene diamine sebacate and mixtures thereof, said laurolactam in amounts of from 80% to 20% by weight and said co-condensible monomer member in amounts of 20% to 80% by weight, said film suitable as a coating and heat activated adhesive, said method comprising:
   drying said resin while in the solid state until the surface thereof is substantially water free;
   extruding said dried resin through an extruder while heating said resin until molten and to a temperature sufficient substantially to volatilize and drive off the unreacted monomer contaminants present, but below the degradation temperature of said resin;
   expelling said molten resin from said extruder into heated, sheeting die means for additional heating thereof, for driving off further said unreacted monomer contaminants, and for forming a film thereby from said molten resin;
   dropping said film onto substrate backing means; and
   running said film and said substrate backing means through roller means for controlling the thickness of said film.

9. The method of claim 8 further comprising vacuum aiding the driving off of said unreacted monomer contaminants during said extruding.

10. The method of claim 8 wherein said extruder is heated to and maintained at a temperature of above approximately 350° F. but below approximately 420° F., whereby said unreacted monomer contaminants may be substantially volatilized and driven off without degrading said molten resin.

11. The method of claim 8 wherein said unreacted monomer contaminants are driven off in amounts of approximately 1 to 4 percent of molten resin present by weight.

12. The method of claim 8 further comprising mechanically mixing said molten resin prior to said expelling thereof into said heated sheeting die means.

13. The method of claim 12 further comprising further heating said molten resin prior to said mechanical mixing.

14. The method of claim 12 further comprising screening said molten resin through breaker plate means prior to said further heating.

15. A method of producing a pigmented film from resin particles consisting essentially of a mixed polyamide condensation product of laurolactam monomer and a co-condensible monomer member selected from the group consisting of caprolactam, hexamethylene diamine adipate, hexamethylene diamine sebacate and mixtures thereof, said laurolactam in amounts of from 80% to 20% by weight and said co-condensible monomer member in amounts of 20% to 80% by weight, said film suitable as a coating and hot melt adhesive, said method comprising:
   drying said resin while in the solid state until the surface thereof is substantially water free;
   mixing into said dried resin a concentrate of dry resin and dried pigment;
   extruding said resin and concentrate mixture through an extruder while heating until molten said resin and concentrate in said extruder and to a temperature sufficient substantially to volatilize and drive off the unreacted monomer contaminants present, but below the degradation temperature of said resin;
   expelling said molten resin from said extruder into heated sheeting die means for additional heating thereof, for further driving off said unreacted monomer contaminants, and for forming a film thereby from said molten resin;
   dropping said film onto substrate backing means; and
   running said film and said substrate backing means through roller means for controlling the thickness of said film.

* * * * *